Patented May 4, 1954

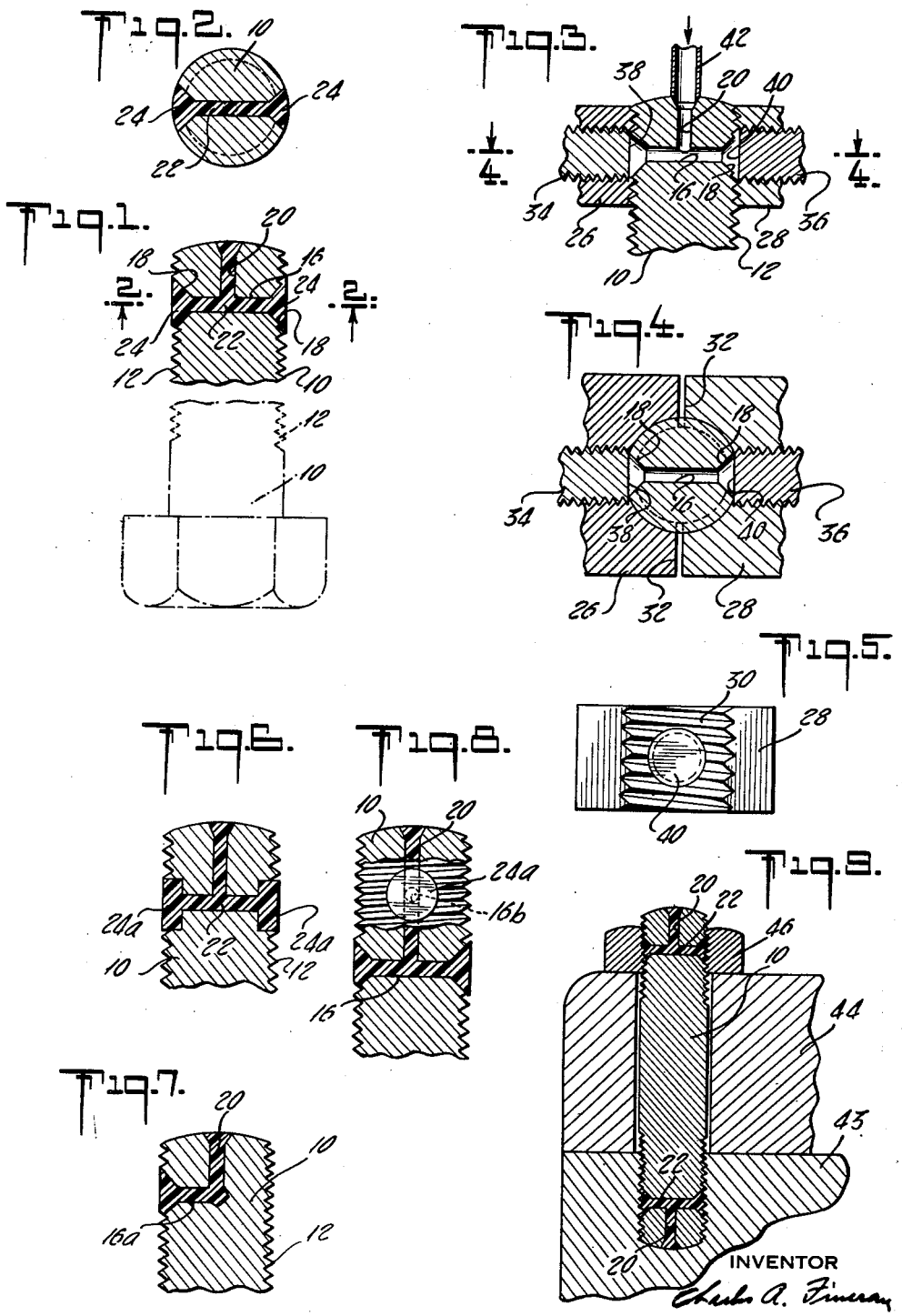

2,677,149

UNITED STATES PATENT OFFICE 2,677,149

DIE STRUCTURE FOR THE MANUFACTURE OF SELF-LOCKING FASTENING DEVICES

Charles A. Fineran, East Orange, N. J., assignor to Elastic Stop Nut Corporation of America, Union, N. J., a corporation of Delaware Application August 11, 1949, Serial No. 109,694

4 Claims. (Cl. 18—36)

The present invention relates to screw threaded fastening devices and has particular reference to externally threaded devices such as bolts, screws, studs and the like, which may or may not be headed. Still more particularly the invention relates to such devices in which self locking action is provided through the inclusion in the device of a locking element of thread impressionable elastic plastic material located to have a thread impressed therein by a companion internal thread so that the latter is elastically gripped by the locking element to hold the threaded parts against relative rotation under the influence of vibration to which they may be subjected in use.

Various forms of devices of the general character above described have heretofore been proposed, but so far as I am aware, all such previously proposed devices have been not entirely satisfactory, either because of lack of sufficient holding power, reduction in strength of the article, high cost or other reasons which have prevented the attainment of practical commercial success. It is therefore the general object of this invention to provide a new and improved device of the character under discussion which will provide adequate holding power; which will not be appreciably impaired as to strength characteristics by the inclusion of the locking element and which may readily be manufactured on a production basis at low cost. The invention further includes among its objects the provision of novel and improved means for the manufacture of such devices, and for a better understanding of the nature of the above mentioned and other objects, and the manner in which they may be attained, reference may best be had to the ensuing portion of this specification taken in conjunction with the accompanying drawings forming a part hereof, in which:

Fig. 1 is a longitudinal central sectional view of a device made by the invention;

Fig. 2 is a section taken on line 2—2 of Fig. 1;

Fig. 3 is a longitudinal central section showing apparatus for forming the locking insert in the device of Fig. 1;

Fig. 4 is a section taken on the line 4—4 of Fig. 3;

Fig. 5 is an elevation of one of the die blocks shown in Fig. 3;

Figs. 6 to 8 are views showing different embodiments of devices made by the invention; and Fig. 9 is a sectional view showing an application of a stud made by the invention.

Referring now more particularly to Figs. 1 and 2 of the drawings there is shown an externally threaded device made by the invention and by way of example but without limitation it has been indicated as a metal bolt of usual form having a shank 10 provided with the external thread 12 and a hexagonal head, the latter being indicated in dot and dash lines, since insofar as the present invention is concerned the presence or absence of a head, or its form are immaterial, as is also the particular metal of the bolt.

In the present embodiment the shank 10 is provided with a cavity for receiving material forming a locking insert, which cavity comprises a transversely extending diametral bore 16 of relatively small diameter as compared with that of the shank, being countersunk at its ends to provide enlargements 18, and an axially extendbore 20, also small in diameter relative to that of the shank, which extends from bore 16 to one end of the shank. The bores 16 and 20 are filled with an elastic plastic material of moldable and thread impressionable nature providing a locking insert 22 having enlarged or headed portions 24 providing exposed locking surfaces projecting radially at least beyond the minor diameter of the thread 12 to have threads impressed therein when the device is screwed into a companion internal thread, the thread impression being operative to plastically displace the material of the insert and compress it so that the insert is placed under pressure and the desired locking action is obtained by the elastic pressure engagement of the locking surfaces of the insert with the surfaces of the companion thread.

Within the scope of the invention any suitable material may be employed for the insert, but by way of example such materials as the class commonly referred to as artificial thermoplastics and including such moldable substances as cellulose derivatives, various synthetic resins such as vinyl and styrene derivatives and linear polyamides such as the polymeric condensation product of a dibasic acid and a diamene known commercially as nylon may be used, nylon being a preferred material.

In accordance with one phase of the invention the locking insert is formed by an injection molding operation, advantageously by means of apparatus of the kind shown in Figs. 3 to 5. Referring to these figures the apparatus comprises separable die blocks 26 and 28 providing between their confronting faces a die cavity having a bore provided with an internal thread 30 and adapted to be clamped against the device into which the insert material is to be injected. Such blocks may readily be made by suitably boring and threading a solid die block and thereafter parting it diametrally of the bore, the material removed by the parting operation providing the highly desirable clearance spaces 32 between the blocks when they are clamped in position, such clearance compensating for variations in thread size of the articles treated and insuring tight contact in all cases between the threads of the blocks and the thread of the article clamped between them, so that the thread of the latter adjacent to the open ends of the insert cavity is filled.

The blocks 26 and 28 are also bored transversely and preferably threaded to receive the plugs 34 and 36, the inner faces 38 and 40 of which are shaped and positioned to determine the contour and positions of the exposed faces of the locking insert. As previously noted, the locking faces of the insert are positioned radially outwardly at least beyond the minor diameter of the thread, so as to be engaged by a companion thread. They may however extend beyond the pitch diameter to, or even beyond, the major diameter of the thread, the extent of projection beyond the minor diameter to secure the best results depending upon the specific physical properties of the locking material used, and being determined by the positioning of the inner faces 38 and 40 of the plugs in the die blocks. While for ease of manufacture and adjustment of the depths of the recesses in the die blocks, threaded plugs are advantageous, it is apparent that other means may be employed, such as plugs having driving fits in the die blocks, or by forming suitable recesses directly in the die blocks by machining operations.

In order to inject the locking insert material, an injection nozzle 42 is brought into pressure contact with the open end of bore 20 and the insert material injected under pressure, usually accompanied by heat in the case of thermoplastic materials. The close pressure contact of the threaded die blocks is sufficient to prevent appreciable flow of the material circumferentially away from the enlarged ends or heads 24 of the insert. As will be apparent to those skilled in the art, the dies 26, 28, and nozzle 42 are readily adapted to be mounted for use in injection molding machines of known kind in which multiple die assemblies may be used, so that a plurality of units may have insert material injected thereinto simultaneously by a single stroke or "shot" of the machine. Thus economy of production is readily attained.

The particular form of insert illustrated need not necessarily be adhered to, but presents numerous practical advantages of material importance. By employing the enlarged heads, ample bearing area is secured to provide adequate locking surface while at the same time the relatively small diameter of the bore 16 results in practically negligible weakening of the strength of the shank. Also, the location of the bore 20 at the axis of the shank has no appreciable adverse effect on mechanical strength.

As will readily be observed, the form of the insert inherently locks it in place in the shank without necessity for working the metal of the shank to form retaining abutments of any kind. Locking material of the kind contemplated does not ordinarily bond itself to a metal surface and consequently plastic deformation and the elastic memory of the entire body of material in the bore 16 is usefully available for locking action. At the same time, the relatively small diameter of the bores 16 and 20, coupled with the fact that they intersect at a right angle, provide a construction which prevents plastic "cold flow" of the compressed insert material sufficient to relieve the internal pressure of the material. In other words, compression of the material due to the impression of threads in the locking portions 24 does not result in the extrusion by cold flow of material through the open bore 20 to an extent adversely affecting the locking action.

The exact configuration of the enlarged head portions 24 is not critical but the conical form shown in the described embodiment is advantageous from a production standpoint, since the enlargements can readily be made with a standard countersink producing a recess with a 90° included angle and actual tests have proved such head configurations to be entirely satisfactory. Conical heads with other included angles may be employed with the scope of the invention if desired, heads of other than conical form may be used, as for example cylindrical heads such as are indicated at 24a in Fig. 6.

While in most instances a form of insert provided by a transverse bore extending through the shank to provide opposed gripping surfaces may be preferable, the invention is not limited to such construction. In some instances the gripping action of one surface may be sufficient and other factors may make a transverse through bore undesirable, in which case the bore 16a, as shown in Fig. 7, may extend only to the extent necessary to intersect bore 20. In other cases, particularly of large diameter units, more than two gripping surfaces may be desirable, in which case a plurality of transverse bores 16 intersecting bore 20 may be provided, either in the same plane or in different planes as shown in Fig. 8 wherein in addition to the bore 16 in one plane, a second bore 16b at right angles to bore 16 and at a different level, provides for additional locking surfaces one of which is shown at 24a. Obviously other forms of cavities may be used.

The invention is readily applicable to studs used in assemblies where locking action is desired between the stud and two or even more additional elements and in Fig. 9 there is shown by way of example a form of stud suitable for use as a holddown element for retaining the removal cylinder head of an internal combustion engine. In this Figure 43 is the cylinder block into which the stud 10 is screwed, 44 is the cylinder head and 46 the retaining nut engaging the stud. In this instance the stud is provided with inserts 22 at each end, one of which grippingly engages the block while the other engages the nut to provide a vibration proof assembly without the necessity for a special lock nut or washer. In the embodiment illustrated, separate cavities are formed at each end of the stud but it will be apparent that a single bore 20 might be used, as is shown in Fig. 8. However, except in the case of very short studs, the cost of drilling and the excessive amount of locking material needed, which is usually relatively expensive as compared with metal, makes the single bore construction less desirable than the construction shown.

From the foregoing it will be apparent that the invention may be embodied in many different specific forms and it is accordingly to be understood as embracing all apparatus falling within the scope of the appended claims.

What is claimed:

1. A die for making devices of the character described, comprising a body having an internally threaded surface adapted to engage the thread of an externally threaded work piece held against the die, a transverse bore intersecting said surface and a plug located in said bore and terminating short of the minor diameter of the thread of said internally threaded surface, said bore and said plug being located to form a shallow recess registering with an opening in the externally threaded wall of said work piece, whereby to permit material forced through said opening to project at least beyond the minor diameter of said external thread while confining the material to substantially the area of said opening, due to the engagement of the threads around said opening and said recess.

2. A die as set forth in claim 1 in which said plug is adjustable.

3. A die as set forth in claim 2 in which said bore and said plug are in screw threaded engagement.

4. A die structure for making devices of the kind described comprising a pair of die blocks each having an internally threaded surface and adapted to clamp between them an externally threaded work piece, the sum of the peripheral extent of said internally threaded surfaces being less than 360° to provide clearance between the confronting faces of the blocks when the work piece is clamped between them, each of said blocks having a shallow recess in the internally threaded surface and said recesses being aligned to register with the openings at the opposite ends of a transverse bore extending through said work piece.

References Cited in the file of this patent

UNITED STATES PATENTS

| Number | Name | Date |
|---|---|---|
| 522,792 | Hubbell | July 10, 1894 |
| 837,767 | Aims | Dec. 4, 1906 |
| 2,159,866 | Simmonds | May 23, 1939 |
| 2,286,336 | Brooke | June 16, 1942 |
| 2,407,160 | Kahn | Sept. 3, 1946 |
| 2,409,638 | Lyon | Oct. 22, 1946 |
| 2,421,105 | Warren | May 27, 1947 |
| 2,485,323 | Schwartz | Oct. 18, 1949 |
| 2,520,121 | Brutus | Aug. 29, 1950 |
| 2,568,274 | Clark | Sept. 18, 1951 |

FOREIGN PATENTS

| Number | Country | Date |
|---|---|---|
| 496,638 | Great Britain | Dec. 2, 1938 |
| 504,853 | Great Britain | May 2, 1939 |